United States Patent [19]
Lazzari et al.

[11] Patent Number: 6,014,292
[45] Date of Patent: Jan. 11, 2000

[54] MAGNETIC RECORDING MEDIUM AND MAGNETIC HEAD ASSEMBLY WITH A MEDIUM MAGNETIC COATING HAVING A HIGH PRODUCT OF RESIDUAL MAGNETIZATION AND THICKNESS

[75] Inventors: Jean-Pierre Lazzari, Corenc, France; Yasuo Fujima; Yoshinobu Okumura, both of Osaka, Japan; Joel R. Weiss, Fremont, Calif.

[73] Assignees: Silmag, Saint-Egreve, France; Akashic Memories Corporation, San Jose, Calif.; Kubota Corporation, Osaka, Japan

[21] Appl. No.: 08/976,661

[22] Filed: Nov. 24, 1997

[30] Foreign Application Priority Data

Dec. 11, 1996 [FR] France .................................. 96 15214

[51] Int. Cl.⁷ ............................... G11B 5/74; G11B 5/39
[52] U.S. Cl. ........................................ 360/131; 360/113
[58] Field of Search ........................... 360/131, 134–135, 360/113

[56] References Cited

U.S. PATENT DOCUMENTS

| | | |
|---|---|---|
| 5,434,733 | 7/1995 | Hesterman et al. . |
| 5,572,392 | 11/1996 | Aboaf et al. . |
| 5,750,270 | 5/1998 | Tang ........................................ 428/611 |
| 5,815,343 | 9/1998 | Ishikawa ................................. 360/134 |
| 5,830,584 | 11/1998 | Chen ....................................... 428/611 |

FOREIGN PATENT DOCUMENTS 2-165401   6/1990   Japan .

OTHER PUBLICATIONS

D. D. Tang, et al., Journal of Applied Physics, vol. 75, No. 10, part 2B, pp. 6397–6399, "Omega Head–An Experimental 120–Turn Inductive Head", May 15, 1994.

Xiaodong Che, et al., Journal of Applied Physics, vol. 73, No. 10, part 11A, pp. 6004–6006, "Study of Magnetic Recording Transitions At Very Low Flying Heights", May 15, 1993.

*Primary Examiner*—A. J. Heinz
*Attorney, Agent, or Firm*—Oblon, Spivak, McClelland, Maier & Neustadt, P.C.

[57] ABSTRACT

A magnetic recording medium and a thin film planar magnetic head form an assembly. The magnetic recording medium of the assembly includes a magnetic coating having a residual magnetization value (Mr) and a thickness value (t) which together form a high product value (Mr)(t) which is preferably greater than about 1.8 memu/cm². This coating also has a high coercive field value of Hc which is preferably greater than about 2,200 Oe. The ratio formed by dividing the (Mr)(t)product value by this coercive field value Hc((Mr)(t)/Hc) is preferably approximately $0.7 \times 10^{-3}$ memu/cm²/Oe or $0.8 \times 10^{-3}$ memu/cm²/Oe. The product of the (mr)(t) product value and the coercive field value Hc ((Mr)(t)(Hc)) is preferably greater than approximately 4000 Oe×memu/cm². The overall effect of the present invention is to provide the magnetic medium coating with an enlarged hysteresis loop as compared to that conventionally used with such assemblies so that there is a resulting increased amplitude reading signal with an improved signal to noise ratio.

4 Claims, 4 Drawing Sheets

MAGNETIC RECORDING MEDIUM AND MAGNETIC HEAD ASSEMBLY WITH A MEDIUM MAGNETIC COATING HAVING A HIGH PRODUCT OF RESIDUAL MAGNETIZATION AND THICKNESS

DESCRIPTION

1. Technical Field

The present invention relates to an optimized recording medium-magnetic head assembly.

It is used in the magnetic recording of informations, e.g. on disk.

2. Prior Art

FIGS. 1 and 2 diagrammatically show in their lower part, the pole pieces of two types of known heads, respectively the early heads having pole pieces perpendicular to the recording medium, and the more recent thin film planar heads having pole pieces parallel to the medium. The magnetic field produced by these heads can be measured by an atomic force microscope. The intensity of said field is shown in the top part of the drawings.

More specifically, in FIG. 1 (at the bottom) are shown two pole pieces 10, 12 and (at the top) the surface representing the amplitude of the horizontal componet Hx of the magnetic field as a function of the distance x from the centre of the gap and along the transverse dimension.

In similar manner, FIG. 2 shows two pole pieces 20, 22 (at the bottom) and the surface 24 representing said same variations (at the top).

It can be seen that the horizontal gradient is greater for thin film planar heads (FIG. 2) than for the early heads (FIG. 1). This difference is due to the form of the field lines in the two head types. In an early head of the type shown in FIG. 1, the field lines are substantially perpendicular to the recording medium, whereas in a thin film planar head, the lines shown in FIG. 2 are substantially parallel to the support. In said drawings are also shown the positive and negative magnetic loads, which are naturally fictional, but which better illustrate the phenomena.

With regards to the medium on which the informations are recorded, it is generally in the form of a disk covered with a magnetic coating. In said coating, the information is recorded in the form of a magnetic transition separating two regions where the magnetization has opposite direction orientations. The length of the magnetic transition recorded in the coating is dependent on the product of the thickness of the magnetic coating by the magnetization of the coating. Generally the aim is to reduce this product, in order to increase the lineic density of recorded information.

Unfortunately this tendency has limits, because at the same time it leads to a reduction of the magnetic energy stored in the coating and therefore to a reduction of the reading signal.

Reference should be made to FIGS. 3 and 4 for further details concerning the relationship existing between the magnetic field produced by the head and the form of the magnetic transition recorded in the magnetic coating. FIGS. 3 and 4 use a geometrical construction, which provides more relevant information than a theoretical calculation, for linking the field produced by the head with the magnetization recorded in the coating.

In FIG. 3, curve A, top left, represents the variation of the horizontal component Hx of the field produced by the head as a function of the abscissa x. The abscissa axis corresponds to the horizontal axis of the recorded track. This variation has a bell shape, whereof only half is shown, the other half, in broken lines, being symmetrical.

Curve B, top right, represents a branch of the hysteresis loop of the magnetic coating of the disk. It is known that such a loop links the magnetization M in the coating to the magnetic field applied. Generally, the field is plotted on the abscissa and the magnetization on the ordinate, but, for obvious reasons of correspondence with the curve A of the left-hand part, here the field $H_x$ is plotted on the ordinate and the magnetization M on the abscissa. In this way, the value of the field of one point of the curve B can immediately be made to correspond with the corresponding field of a point relative to the curve A.

Curve C, bottom left, shows the variation of the magnetization M in the coating, as a function of the abscissa x along the horizontal axis of the coating. Thus, this abscissa axis is parallel to that corresponding to curve A.

Curve C can be constructed point by point. For this, it is necessary, for each abscissa x of a point of the curve A, to find the value of the magnetization in FIG. B for transferring said value into the graph bottom left and whilst retaining the same abscissa x. As an example of this construction, it is possible to take a point M on curve A, whose abscissa is $x_1$ and the ordinate $H_1$. With said point M corresponds a point N on the curve B with the same ordinate. To it corresponds a magnetization $M_1$. For the same abscissa $x_1$ and for said value $M_1$ of the magnetization, there is a point P in the coordinate system M,x bottom left and said point is one of the points of the sought curve C. Knowing the curve A for a head and the curve B for a coating, the transition C in the coating can be deduced therefrom.

The curves of FIG. 3 correspond to an early head, like that of FIG. 1. FIG. 4 shows the same curves, but for a horizontal thin film head. It can be seen that the magnetic transition obtained (curve C) is narrower in the second case than in the first.

The reading signal obtained on the basis of such transitions (curves C of FIGS. 3 and 4) is bell-shaped, as illustrated in FIG. 5 (signal S). To evaluate the width of the transition, reference is often made to the half-intensity width of the reading signal and which is conventionally designated Pw50.

Although the recorded magnetic transition is narrower with a planar thin film head than with a conventional head, this is not sufficient for increasing the lineic recording density, because the latter is essentially dependent on the signal-to-noise ratio. However, noise is virtually constant for a complete reading chain and action must therefore take place on the reading signal. With the conventional heads like that of FIG. 1, such an increase is scarcely possible. Thus, in the coating forming the seat of a magnetic transition, a rebalancing takes place following the writing operation, between the coercive field and the demagnetizing field. In a first approximation, the latter is proportional to the product of the thickness t of the magnetic coating by the value of the residual magnetization, i.e. Mr. For conventional heads, which supply a relatively small field gradient, the increase of the recording density still takes place by a decrease of the product (Mr)t, in order to reduce the demagnetizing fields. This tendency makes the solution of the problem even more difficult, because the reading signal decreases correlatively. Thus, a seemingly insoluble problem is encountered.

DESCRIPTION OF THE INVENTION

The object of the present invention is to solve this problem. To this end, the invention no longer proposes reducing the product (Mr)t, but paradoxically increasing it. This is only possible by using a planar thin film head (FIG. 2) for which the horizontal field gradient is high. Moreover, according to another feature of the invention, the coercive field Hc of the magnetic film is also increased compared with conventional values which, combined with the increase of the product (Mr)t, maintains the (Mr)t/Hc ratio substantially constant or possibly reduces it slightly. The increase of the residual magnetization Mr and the coercive field Hc widens the hysteresis loop of the material constituting the magnetic recording film, which increases the area defined by said loop. This increase in the area leads to a rise in the energy stored in the coating and therefore to an increase in the amplitude of the reading signal, whilst an equilibrium is maintained between the demagnetizing field and the coercive field. There is a slight or no reduction to the width Pw50, but a higher reading signal is obtained, so that there is a better signal-to-noise ratio. It would also be possible to increase the recording density, either by decreasing the length of the transition, or by reducing its width (or in other words reducing the track width).

Thus, more specifically, the present invention relates to a recording medium-magnetic head assembly, in which the medium comprises a magnetic coating having a certain residual magnetization Mr, a certain thickness t, i.e. a certain product (Mr)t, a certain coercive field Hc and a certain (Mr)t/Hc ratio, said assembly being characterized in that the magnetic head is a thin film planar magnetic head and that the magnetic coating of the medium has a high product (Mr)t for a given (Mr)t/Hc ratio, permitting the obtaining of higher exploitable recording densities.

Preferably, the coercive field Hc is chosen above approximately 2200 Oe.

Preferably, the product (Mr)t is in excessive of approximately 1.8 in CGS units. In this system, Mr is measured in memu/cm$^3$, t in centimeters, Hc in Oersted. The product (Mr)t is consequently expressed in memu/cm$^2$.

Preferably, the ratio (Mr)t/Hc is approximately 0.7 or $0.8 \cdot 10^{-3}$ memu/cm$^2$/Oe.

The product of the coercive field Hc by the quantity (Mr)t exceeds approximately 4000 Oe.memu/cm$^2$.

DESCRIPTION OF AN EMBODIMENT

The following tables illustrate an embodiment of the invention. These tables give various characteristics of the magnetic coating used on the recording disk, knowing that said coating is combined with a horizontal thin film head. Such a head is well known in the art and is e.g. described in FR-A-2 645 314 (or the corresponding U.S. Pat. No. 5,208,716).

The following nomenclature is used in the table:

HfID=high frequency signal in millivolt, measured on the internal diameter.
lFID=low frequency signal in millivolt, measured on the internal diameter.
HfOD=high frequency signal in millivolt, measured on the external diameter.
LfOD=low frequency signal in millivolt, measured on the external diameter.
Pw50ID=width of the isolated peak at mid-height in nanoseconds on the internal diameter.
Pw50OD=width of the isolated peak at mid-height in nanoseconds on the external diameter.
ResID=amplitude ratio of a high frequency signal to a low frequency signal measured on the internal diameter, the resolution being measured in %.
ResOD=amplitude ratio of a high frequency signal to a low frequency signal measured on the external diameter, the resolution being measured in %.
Ow=measurement in dB of the overwrite of the head.
OwID=overwrite for the internal diameter in dB.
OwOD=overwrite for the external diameter in dB.
NLTS=Non Linearity Transition Symmetry, measured in %.

In the four following tables, the first line, designated by the abbreviation Dc, corresponds to a conventional disk, the second line, designated by the abbreviation Do, corresponds to a disk optimized according to the invention and the third line indicates the percentage increase obtained on passing from a conventional disk to a disk optimized according to the invention.

|    | Hf ID (mV) | LF ID (mV) | HF OD (mV) | LF OD (mV) |
|----|------------|------------|------------|------------|
| Dc | 0.186      | 0.306      | 0.246      | 0.452      |
| Do | 0.272      | 0.353      | 0.351      | 0.546      |
| %  | +46        | +15        | +42        | +20        |

|    | Pw50 ID (ns) | RES ID (%) | Pw50 OD (ns) | RES OD (%) |
|----|--------------|------------|--------------|------------|
| Dc | 21.85        | 60.76      | 12.55        | 54.48      |
| Do | 18.34        | 77.04      | 11.58        | 64.21      |
| %  | -17          | +26        | -8           | +17        |

|    | NLTS ID (%) | NLTS OD (%) |
|----|-------------|-------------|
| Dc | 13.7        | 17.7        |
| Do | 6.8         | 12.9        |
| %  | -50         | -27         |

|    | OW ID (dB) | OW OD (dB) |
|----|------------|------------|
| Dc | 24.19      | 25.46      |
| Do | 26.74      | 25.80      |
| %  | +10        | =          |

These tables show that in high frequency, it is possible to increase the reading amplitude by 46%, that the width Pw50 is decreased by approximately 10%, that the overwrite is slightly improved and that the symmetry of the signal is approximately twice better than for a non-optimized disk.

Figure 1:
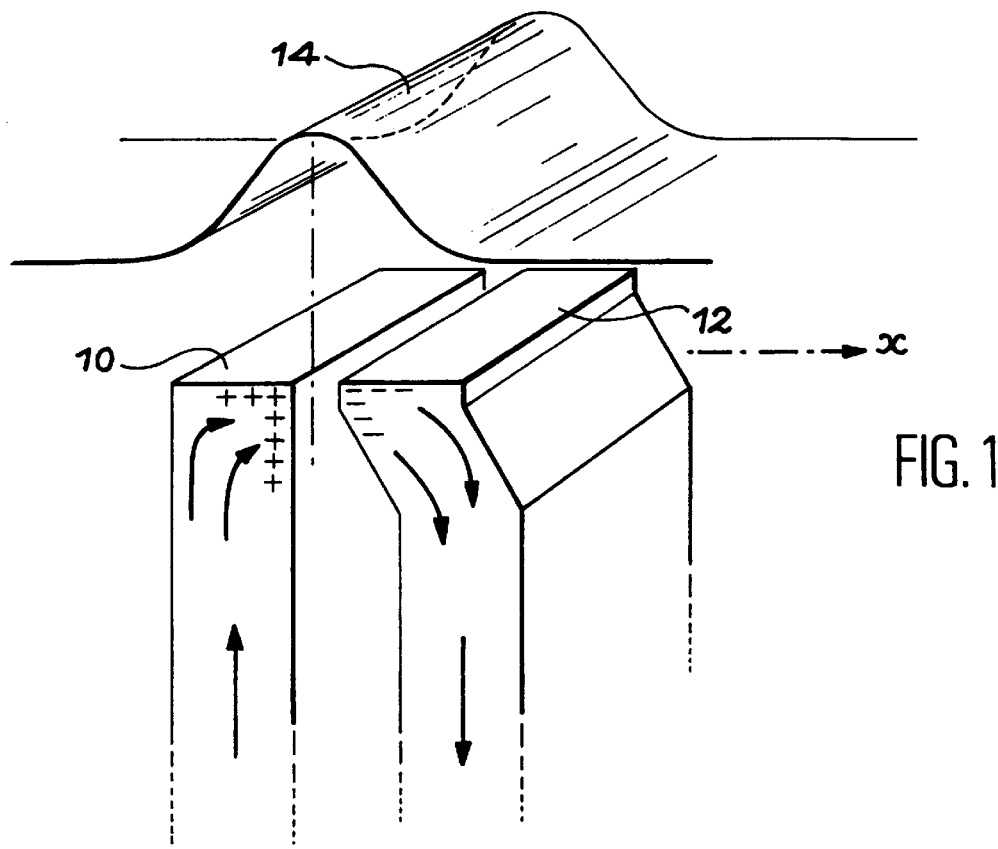
FIG. 1, already described, illustrates an early head having pole pieces perpendicular to the recording medium.
Figure 2:
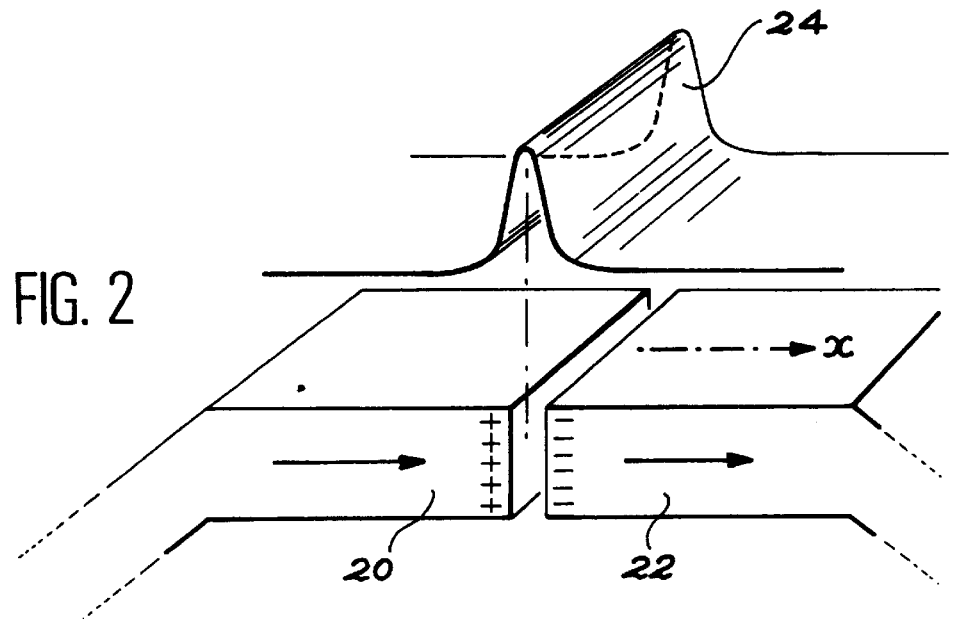
FIG. 2, already described, illustrates a recent, horizontal think film magnetic head.
Figure 3:
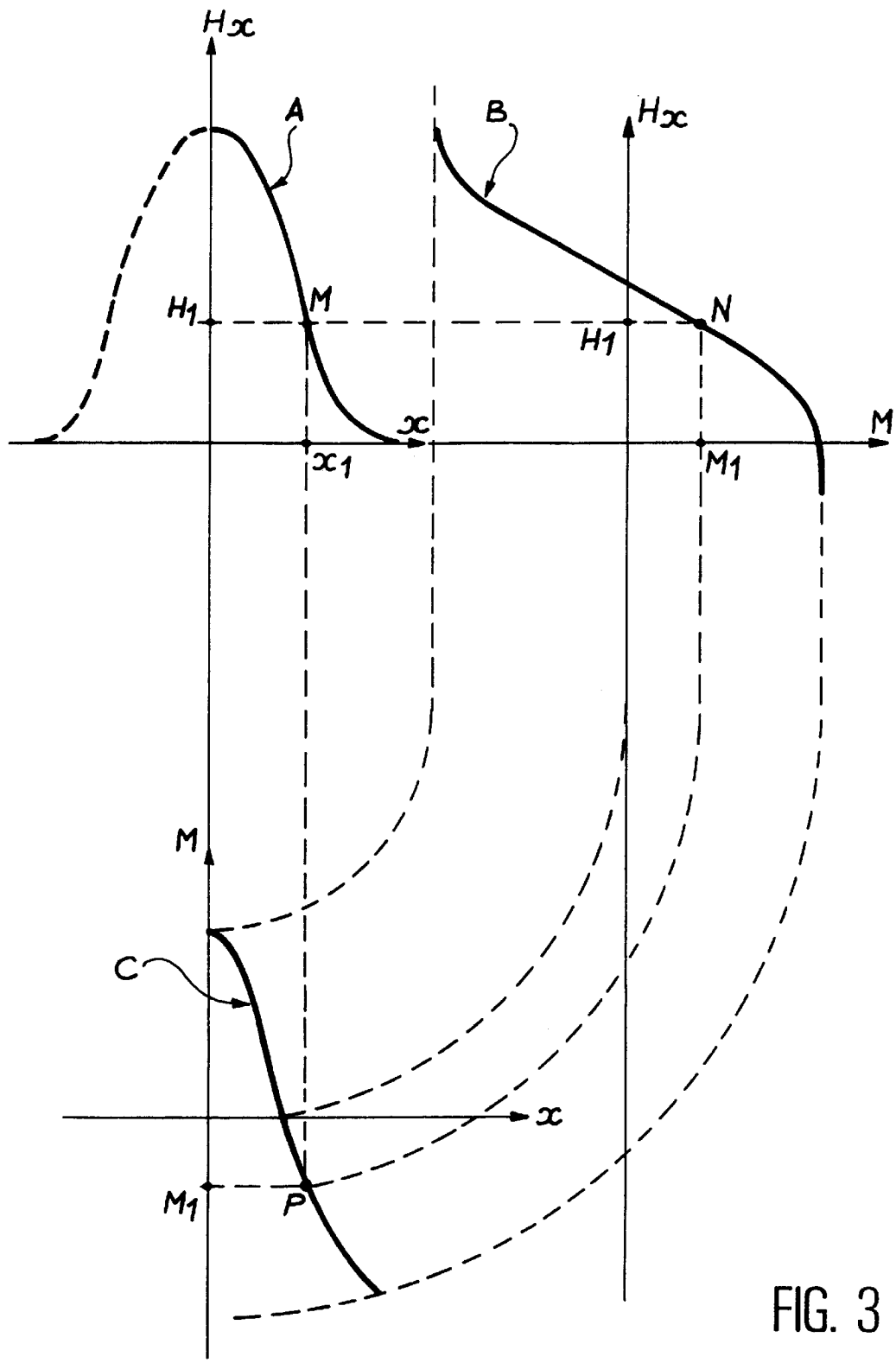
FIG. 3, already described, shows the geometrical correspondence between the field produced by a conventional head and the magnetic transition in the recording coating.
Figure 4:
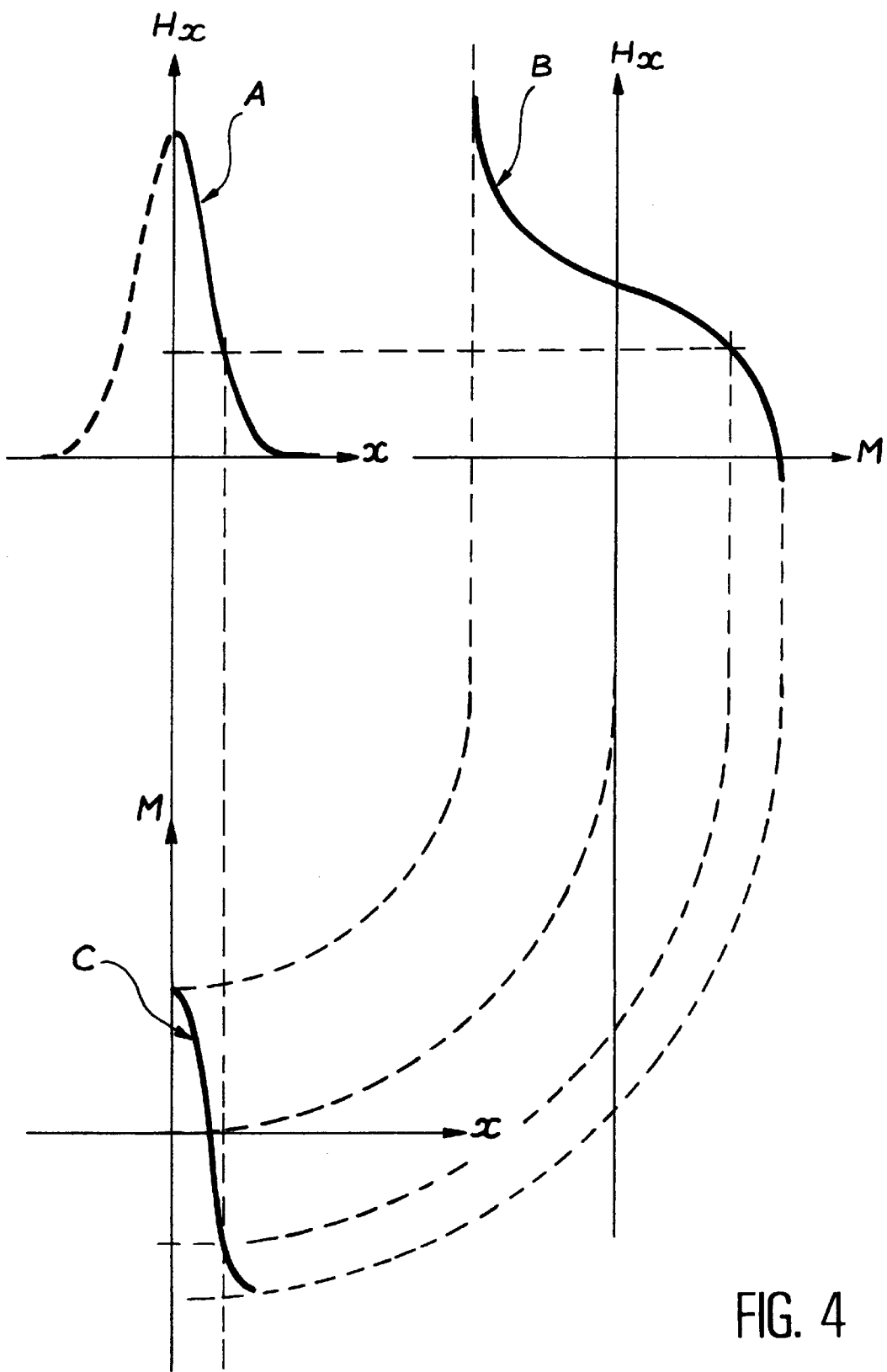
FIG. 4, already described, shows the same correspondence between the field produced by a horizontal thin film head and the magnetic transition in the recording coating.
Figure 5:
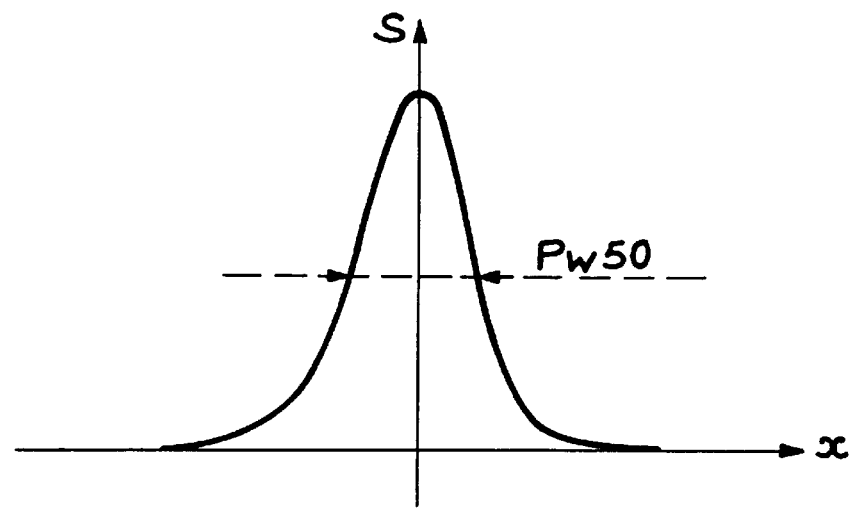
FIG. 5, already described, shows the general form of a reading signal S.
Figure 6:
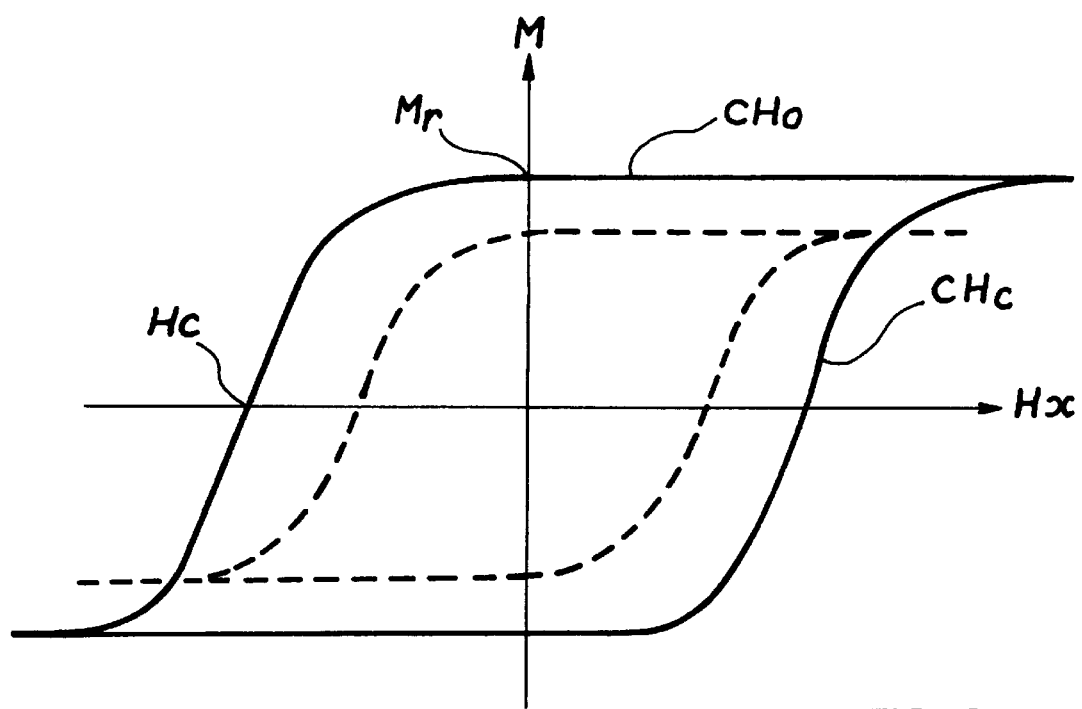
FIG. 6 shows the hysteresis loop of a magnetic coating used according to the invention.

Finally, FIG. 6 shows the hysteresis loop CHo corresponding to the disk optimized according to the invention and the loop CHc corresponding to a conventional disk. The increase in the area defined by the loop is very clear.

It can also be stated that on increasing the coercive field Hc, the high frequency signal will be increased more than the low frequency signal.

On increasing the product (Mr)t, the low frequency signal will be increased more than the high frequency signal.

We claim:

1. A magnetic recording medium and magnetic head assembly, said magnetic head being a thin film planar magnetic head and the magnetic recording medium comprises a magnetic coating having a residual magnetization value Mr and a thickness value t, which together form a product value (Mr)(t) that is greater than about 1.8 memu/cm$^2$, and a coercive field Hc, wherein a ratio of product value (Mr)(t) to Hc is approximately $0.7 \times 10^{-3}$ memu/cm$^2$/Oe or $0.8 \times 10^{-3}$ memu/cm$^2$/Oe.

2. The assembly according to claim 1, wherein the coercive field Hc is higher than approximately 2,200 Oe.

3. The assembly according to claims 1 or 2, wherein a product of the coercive field Hc and the product value (Mr)(t) exceeds approximately 4,000 Oe×memu/cm$^2$.

4. The assembly according to claims 1 or 2, wherein increasing the coercive field Hc leads to a preponderant increase in a level of a high frequency signal.

* * * * *